(12) United States Patent
Wang et al.

(10) Patent No.: US 12,650,606 B2
(45) Date of Patent: Jun. 9, 2026

(54) MICRO-THRUST AND MICRO-IMPULSE APPLICATION DEVICE AND METHOD BASED ON LIGHT PRESSURE PRINCIPLE

(71) Applicants: Innovation Academy for Microsatellites of Chinese Academy of Sciences, Shanghai (CN); Shanghai Engineering Center for Microsatellites, Shanghai (CN)

(72) Inventors: Bin Wang, Shanghai (CN); Hongbin Zhu, Shanghai (CN); Yonghe Zhang, Shanghai (CN); Linlin Wang, Shanghai (CN); Qingyun Mao, Shanghai (CN); Jun Jiang, Shanghai (CN); Shuai Zhi, Shanghai (CN); Pengcheng Wang, Shanghai (CN); Xinyu Wang, Shanghai (CN)

(73) Assignees: Innovation Academy for Microsatellites of Chinese Academy of Sciences, Shanghai (CN); Shanghai Engineering Center for Microsatellites, Shanghai (CN)

( * ) Notice: Subject to any disclaimer, the term of this patent is extended or adjusted under 35 U.S.C. 154(b) by 696 days.

(21) Appl. No.: 17/984,232

(22) Filed: Nov. 9, 2022

(65) Prior Publication Data

US 2023/0073406 A1    Mar. 9, 2023

Related U.S. Application Data

(63) Continuation of application No. PCT/CN2020/089701, filed on May 12, 2020.

(51) Int. Cl.
*G02B 27/14* (2006.01)
*G02B 27/28* (2006.01)

(52) U.S. Cl.
CPC ........... *G02B 27/14* (2013.01); *G02B 27/286* (2013.01)

(58) Field of Classification Search
CPC ...... G01J 1/4257; G02B 27/14; G02B 27/286
See application file for complete search history.

(56) References Cited

U.S. PATENT DOCUMENTS 3,818,700 A * 6/1974 Kantrowitz ........... H01S 3/0007
                                                    244/171.1
3,993,399 A * 11/1976 Jacoby ..................... G03H 1/02
                                                    359/30
5,521,036 A * 5/1996 Iwamoto ............... G03F 9/7026
                                                    250/548
(Continued)

FOREIGN PATENT DOCUMENTS

CN          103590992 A      2/2014
CN          103968989 A      8/2014
(Continued)

*Primary Examiner* — Wyatt A Stoffa
(74) *Attorney, Agent, or Firm* — Mei & Mark LLP; Manni Li

(57) ABSTRACT

A micro-thrust and micro-impulse application device and method generates micro-thrust to a target by light pressure action from laser reflection. The device comprises a laser, a laser adjustment device, a beam splitter, a shutter, a reflector, and a laser power meter. Laser beam is generated by laser, adjusted by laser adjustment device, and divided into two paths by beam splitter. Laser in one path is measured at laser power meter; power measured determines magnitude for micro-thrust. In another path, it irradiates on the reflector on the target via shutter for generating micro-thrust. Light reflected by the reflector arrives at another laser power meter. Power of two laser paths are measured in real time by two laser power meters, acting micro-thrust is calculated by combining parameters including reflectivity and incident angle of laser irradiating the reflector, and light output power of the laser is adjusted in real time.

8 Claims, 2 Drawing Sheets

(56)  References Cited

U.S. PATENT DOCUMENTS

| | | | | |
|---|---|---|---|---|
| 5,647,559 | A * | 7/1997 | Romer | F41G 7/305 |
| | | | | 244/3.13 |
| 6,046,802 | A * | 4/2000 | Ortiz, Jr. | G01N 21/958 |
| | | | | 356/237.1 |
| 6,243,163 | B1 * | 6/2001 | Wakabayashi | G01J 3/28 |
| | | | | 356/326 |
| 6,488,233 | B1 * | 12/2002 | Myrabo | B64C 39/001 |
| | | | | 244/62 |
| 6,530,212 | B1 | 3/2003 | Phipps et al. | |
| 7,080,504 | B2 * | 7/2006 | Pais | F02C 7/264 |
| | | | | 60/39.821 |
| 7,118,075 | B2 * | 10/2006 | Schubert | B64G 1/36 |
| | | | | 244/171.2 |
| 7,339,712 | B2 * | 3/2008 | Kerekes | G02B 26/105 |
| | | | | 359/201.1 |
| 10,207,365 | B2 * | 2/2019 | Chen | B23K 26/0624 |
| 10,261,263 | B2 * | 4/2019 | Stone | B64D 33/00 |
| 10,569,849 | B2 * | 2/2020 | Stone | B63G 8/001 |
| 10,705,296 | B2 * | 7/2020 | Stone | H02J 50/30 |
| 11,726,184 | B2 * | 8/2023 | Ferreira | G01S 17/894 |
| | | | | 356/4.01 |
| 2005/0286576 | A1 * | 12/2005 | Gill | G02B 5/3066 |
| | | | | 372/98 |
| 2006/0215246 | A1 * | 9/2006 | Kerekes | G02B 26/105 |
| | | | | 359/201.1 |
| 2007/0284515 | A1 * | 12/2007 | Sato | G21K 1/006 |
| | | | | 250/251 |
| 2010/0054753 | A1 * | 3/2010 | Futami | G02B 27/286 |
| | | | | 398/152 |
| 2016/0011057 | A1 * | 1/2016 | Liu | H01S 5/042 |
| | | | | 250/338.1 |
| 2016/0096236 | A1 * | 4/2016 | Cho | G01J 5/0801 |
| | | | | 219/76.12 |
| 2016/0199935 | A1 * | 7/2016 | Chen | G01J 3/12 |
| | | | | 219/121.61 |
| 2017/0077671 | A1 * | 3/2017 | Zhou | H01S 5/0064 |
| 2017/0363741 | A1 * | 12/2017 | Send | G01S 7/4816 |
| 2018/0090396 | A1 * | 3/2018 | Li | G01N 21/956 |
| 2018/0308725 | A1 * | 10/2018 | Shin | G01N 21/00 |
| 2022/0364915 | A1 * | 11/2022 | Conforti | H02J 50/30 |
| 2023/0110912 | A1 * | 4/2023 | Oggenfuss | A61B 3/132 |
| | | | | 351/221 |

FOREIGN PATENT DOCUMENTS

| | | |
|---|---|---|
| CN | 105197258 A | 12/2015 |
| CN | 106507921 B | 3/2017 |
| WO | WO 2018/112723 A1 | 6/2018 |

* cited by examiner

MICRO-THRUST AND MICRO-IMPULSE APPLICATION DEVICE AND METHOD BASED ON LIGHT PRESSURE PRINCIPLE

CROSS-REFERENCE TO RELATED APPLICATIONS

The subject application is a continuation of PCT/CN2020/089701 filed on May 12, 2020. The contents and subject matters of the PCT international stage application is incorporated herein by reference.

TECHNICAL FIELD

The present invention relates to precision mechanics and space propulsion, and in particular, a micro-thrust and micro-impulse application device and method based on the light pressure principle.

BACKGROUND ART

As the science and technology and industrial field develop, the need for precise application and control of micro-thrust and micro-impulse is increasing in the fields of aerospace propulsion, precision instrument and equipment manufacturing, biomedicine, etc.

The application of the micro-thrust commonly includes the contact thrust application and non-contact thrust application. The method of contact thrust application refers to using a light and small object to contact a target so as to determine the magnitude of the applied thrust via a piezoelectric sensor installed at the contact position. Alternatively, an accurately weighed bead may be used to contact the target and then the magnitude of the micro-thrust applied may be determined by calculating the magnitude of the component of the weight of the bead in the direction of force application. When these methods are used, the accuracy of the thrust application is limited by the thrust detection range and sensitivity of the piezoelectric sensor or the accuracy of weighing the mass of the object, and it is usually difficult to accurately apply a micro-thrust of 1 μN or less. The non-contact thrust application method includes the capacitive method and the electric comb method using electrostatic force, which can realize the micro-thrust loading to the nN level by the precise control of electrode voltage and electrode distance. According to these methods, the capacitive plate or the electric comb device is installed on the target object, and the operation process of setting and thrust application is complicated. In addition, the non-contact thrust application method also includes a method using magnetic force, which has problems that the magnetic force is difficult to be accurately controlled and calculated, and the relative distance between magnets needs to be accurately controlled.

Therefore, there is a need for a novel micro-thrust application method that improves the control range and accuracy of micro-thrust application while reducing the difficulty of setting and operation.

SUMMARY OF THE INVENTION

In view of all or some of the problems in the existing technology, the present invention provides a micro-thrust and micro-impulse application device and method based on a light pressure principle, which generates a micro-thrust on a target by a light pressure effect generated by photon collision when a laser irradiates the object. The micro-thrust and micro-impulse application device based on the light pressure principle of the present invention comprises a laser configured to generate a laser beam; a beam splitter which is arranged on a light path of the laser and has an included angle with the laser beam generated by the laser for dividing the laser beam into two beams; a shutter arranged on a light path of the laser beam reflected by the beam splitter for controlling an on-off time of the laser beam directed to the target; a reflector arranged on the surface of the target and having an included angle with the laser beam reflected by the beam splitter; and a laser power meter comprising a first laser power meter and a second laser power meter, wherein the first laser power meter is arranged on a light path of a laser beam transmitted through the beam splitter for measuring a light output power of the laser in real time; and the second laser power meter is arranged on a light path of the laser beam reflected by the reflector for measuring a laser power reflected by the reflector.

Further, the device of the present invention may comprise a beam adjustment device arranged between the laser and the beam splitter for adjusting the laser light beam emitted by the laser into parallel light and may also adjust the light beam spatiotemporal distribution characteristics including a polarization state and a phase of the laser, as needed.

Further, the output power of the laser may be adjustable.

Further, the target may be placed in a vacuum environment or in a gas environment with less disturbance of the gas, where the thrust effect from the light pressure is more remarkable.

Further, the incident laser light may be specularly reflected at the reflector, and the reflectivity of the reflector may not be particularly required.

Further, the mutual position of the second laser power meter detection area and the reflector may satisfy that the second laser power meter detection area may be directed towards or at an angle to the propagation direction of the reflected light without affecting the optical power measurement of the reflected light from the reflector. The distance between the power meter detection area and the target to which the reflector is attached should be sufficiently far to ensure that the majority of the laser light reflected at the power meter detection area does not reach the reflector and the target again, reducing the thrust effect of the laser light reflected by the power meter on the target again.

The method for applying a micro-thrust and a micro-impulse based on the device of the present invention comprises:

calculating a reflectance and transmittance ratio of the beam splitter by respectively measuring a power of reflected light and transmitted light passing through the beam splitter;

preliminarily calculating a light output power of the laser and an opening time and a closing time of the shutter, and setting the laser, according to the magnitude of the required applied micro-thrust and micro-impulse, and the magnitude of the reflectivity of the reflector to the laser wavelength;

turning on the laser, measuring by the first laser power meter a laser beam power transmitted through the beam splitter, and calculating the laser beam power reflected by the beam splitter for applying the micro-thrust to the target according to the reflection and transmittance ratio of the beam splitter;

opening the shutter according to the calculated shutter opening time, so that the laser beam is incident on the reflector, and a part of the beam is reflected and another part is absorbed by the reflector. The cross-sectional dimension of the laser beam reaching the reflector should be small enough so that they can all irradiate on the reflector. calculating the magnitude of the micro-thrust applied to the target in real time by means of measuring the power of the laser beam reflected by the reflector by the second laser power meter and according to the power measured by the first laser power meter and the second laser power meter, and judging whether the requirements are met, and if not, adjusting the light output power of the laser in real time; and After the calculated closing time is reached, closing the shutter and turning off the laser.

Further, the magnitude of the micro-thrust applied to the target by the laser is F(t), the vector of the micro-thrust is resolved into two components, parallel to the reflector surface direction and perpendicular to the reflector surface direction, in a plane formed by the incident light and the reflected light of the laser, wherein the magnitude $F_y(t)=F(t)\cos\alpha$ of the component perpendicular to the reflector surface and directed to the direction of the reflector satisfies:

$$F_y(t) = \frac{(k \cdot P_1(t) + P_2(t)) \cdot \cos\theta}{c};$$

and the magnitude $F_x(t)=F(t)\sin\alpha$ of the component parallel to the reflector surface direction satisfies:

$$F_x(t) = \frac{(k \cdot P_1(t) - P_2(t)) \cdot \sin\theta}{c},$$

wherein k is the reflectance and transmittance ratio of the beam splitter; c is the speed of light in vacuum; θ is the incident angle of the laser beam at the reflector; a is the included angle between the direction of the micro-thrust and the normal of the reflector surface; $P_1(t)$ is the power of the laser beam transmitted through the beam splitter; and $P_2(t)$ is the power of the laser beam reflected by the reflector.

The component $F_x(t)$ of the micro-thrust in the direction parallel to the reflector surface is related to the reflectivity of the reflector surface to the laser light. When the reflectivity is high and close to 1, the reflector surface absorbs less incident light and the reflected light power $P_2(t)$ is approximately equal to the incident light power $kP_1(t)$. At this time, the component of the thrust force in the direction parallel to the reflector surface is small and negligible.

Further, the application position and direction of the micro-impulse are consistent with the application position and direction of the micro-thrust, and the magnitude of the micro-impulse I satisfies:

$$I = \int_{t_0}^{t_1} F(t)dt.$$

where $t_0$ is the opening time of the shutter and $t_1$ is the closing time of the shutter.

Further, the method further comprises calculating the micro-thrust and the micro-impulse applied to the target according to the power measured by the first laser power meter and the second laser power meter, and the opening and closing time of the shutter, and applying the micro-thrust and the micro-impulse to a micro-thrust and micro-impulse measuring device and measuring its response so as to calibrate the micro-thrust and micro-impulse measuring device.

The present invention provides a micro-thrust and micro-impulse application device and method based on the light pressure principle, which adjusts the magnitude of the micro-thrust applied by modulating the light output power of a laser to produce a desired micro-thrust level. Since the control and measurement accuracy of laser power can reach very high level, such as pW resolution, and the light pressure thrust generated by a 1 W laser is in the order of 1 nN, the minimum thrust achievable with this method can be as low as in the order of $10^{-21}$ N or less. When a greater thrust generated is desired, a megawatt or higher power laser may be used, with the thrust level on the order of 10 mN. In addition, the device and method of the present invention can adjust the on-off time of the shutter to control the amount of total impulse obtained. Since the shutter on-off time can be as small as the order of microseconds, the minimum applied impulse can be as low as the order of $10^{-28}$ Ns. As the light pressure action time can be freely controlled, when the action time of the selected megawatt laser reaches the order of hours, the impulse generated can reach the order of 100 Ns. As the non-contact type micro-thrust and micro-impulse application device and method are used in the present invention, in addition to the thrust action, the interference and influence on the target are small, and no contact pollution occurs. When the reflectivity of the selected reflector is sufficiently high, the effect of thermal effects on the target is negligible. The principle and method of use of the device are simple and easy to operate. By measuring the real-time power of the light beam, the micro-thrust level applied to the target can be obtained. The action time of the micro-thrust can be obtained from the on-off time of the shutter, so that the impulse applied to the target can be obtained, which can be applied to the calibration of the micro-thrust and micro-impulse measuring device.

BRIEF DESCRIPTION OF THE DRAWINGS

Drawings are provided to clarify advantages and features of embodiments of the present invention; they should not be considered as limiting the scope of invention.

DETAILED DESCRIPTION OF THE INVENTION

The present invention is described in detail in the following embodiments in connection with the drawings. One of skilled in the art may modify the embodiments of the present invention as described herein without departing from the scope of protection of the invention.

The present invention provides a micro-thrust and micro-impulse application device and method based on a light pressure principle. The device and method control the magnitude of the micro-thrust applied to the target in real time by adjusting the light output power of the laser and control the magnitude of the micro-impulse applied to the target by the laser light pressure by means of controlling the light output time of the laser. Specific embodiments of the present invention is further described with reference to the drawings.

Figure 1:
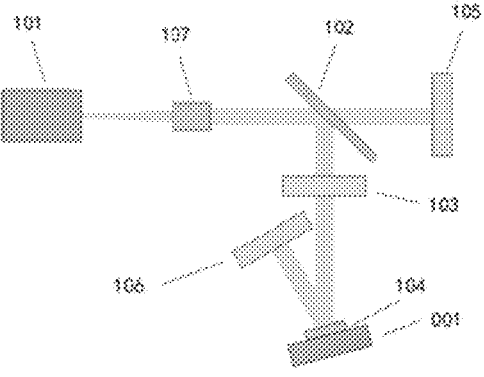
FIG. 1 shows the structure of the micro-thrust and micro-impulse application device based on the light pressure principle according to an embodiment of the present invention.
Figure 2:
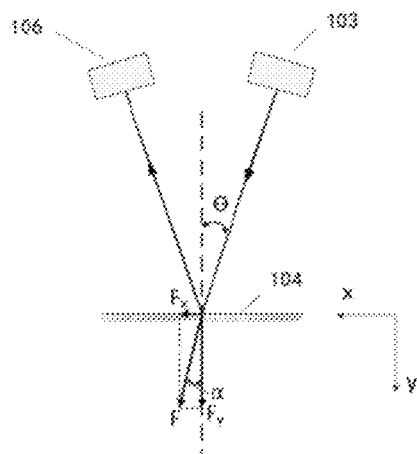
FIG. 2 shows the schematic diagram of the micro-thrust application based on the light pressure principle according to an embodiment of the present invention.

As shown in FIG. 1, a micro-thrust and micro-impulse application device based on a light pressure principle, which is a non-contact device, applies a micro-thrust to a target 001 by using a laser, where the target 001 can be placed in a vacuum environment, or a gas environment with a smaller influence from gas disturbance, so as to reduce the influence of an atmospheric disturbance thereon, so that the generated light pressure effect is more significant. The device of the present invention comprises:

a laser 101 configured for generating a laser beam; in an embodiment of the present invention, the output power of the laser is adjustable; the magnitude of a micro-thrust applied to the target 001 can be controlled by adjusting the light output power of the laser 101; and according to different selected laser powers, the device may not only provide a micro-thrust of less than the order of $10^{-21}$ N, but also achieve a micro-thrust of the order of 10 m N;

a beam splitter 102 which is arranged on a laser output light path of the laser 101, has an included angle with the laser beam generated by the laser 101, and divides the laser beam into two beams by reflection and transmission, wherein the reflection and transmission ratio of the beam splitter can be changed by adjusting the included angle; in an embodiment of the present invention, a beam adjustment device 107 is further arranged between the laser 101 and the beam splitter 102, wherein the beam adjustment device 107 is used for, after adjusting the laser beam emitted by the laser 101 into parallel light, being incident on the beam splitter 102; the beam adjustment device 107 can also be used for adjusting beam spatiotemporal distribution charac-teristics of the laser beam, including a polarization state and a phase of the laser, as needed;

a shutter 103 arranged on a light path of the laser beam reflected by the beam splitter 102 for controlling the on-off of the laser beam directed to the target 001; by controlling the opening and closing time of the shutter 103, the time when the laser passes through the shutter can be accurately controlled, and then the time when the micro-thrust is applied to the target 001 is con-trolled, so as to control the magnitude of the micro-impulse applied to the target 001; in an embodiment of the invention, the on-off time of the shutter is control-lable to the order of microseconds, so that the device can apply micro-impulses down to the order of $10^{-28}$ Ns and up to the order of 100 Ns;

a reflector 104 fixed on the surface of the target 001; as shown in FIG. 2, the reflector 104 has an included angle with the laser beam reflected by the beam splitter 102, and the laser beam reflected by the beam splitter 102 is specularly reflected at the reflector 104 at a certain angle θ; in an embodiment of the invention, the reflec-tivity of the reflector 104 for the laser wavelength is higher than 99.9%, so that the thermal effect on the target 001 is negligible; and a laser power meter including a first laser power meter 105 and a second laser power meter 106, wherein the first laser power meter 105 is arranged on a light path of a laser beam transmitted through the beam splitter 102, the laser beam transmitted through the beam splitter 102 irradiates on an optical power detection area of the first laser power meter 105, and the real-time power of the laser 101 can be measured by using the reflectance and transmittance ratio of the beam splitter; the second laser power meter 106 is arranged on a light path of a laser beam reflected by the reflector 104, the laser beam reflected by the reflector 104 irradiates on the optical power detection area of the second laser power meter 106, and the laser power reflected by the reflector 104 can be measured; in order to reduce the influence of the light reflected on the second laser power meter 106 re-irradiating on the target to generate an additional light pressure thrust, the distance between the second laser power meter 106, the target 001 and the reflector 104 should be kept far; when the space is limited, the influence can be reduced by adjusting the orientation of the second laser power meter 106 so that there is an included angle between the second laser power meter 106 and the reflected light of the reflector, or adding a reflector between the reflector 104 and the second laser power meter 106 so as to increase the light path distance, etc.; in an embodiment of the present invention, the beam is diffusely reflected at the second laser power meter 106, and the distance should not be less than 40 cm when the projection area of the thrust-applied object on a plane perpendicular to the direction of the reflected beam of the reflector 104 is 10 cm$^2$. At this time, the laser power irradiated on the target 001 and the reflector 104 after the diffuse reflection at the second laser power meter is less than 0.1% of the total diffuse reflection optical power, and the light pressure thrust effect generated by this part of light is negligible.

Figure 3:
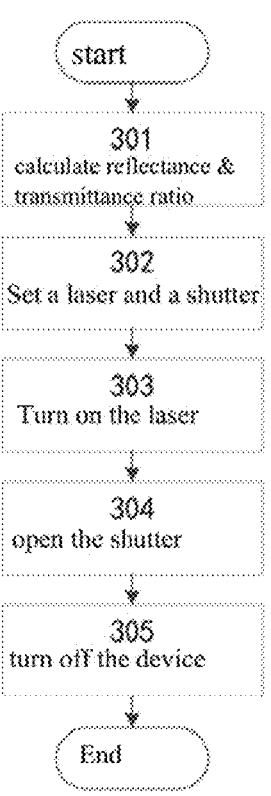
FIG. 3 is a flow chart showing the micro-thrust and micro-impulse application method based on the light pressure principle according to an embodiment of the present invention.

As shown in FIG. 3, the method for applying a micro-thrust and micro-impulse by the device of the present invention comprises:

Step 301, calculating a reflection and transmittance ratio, calculating a reflection and transmittance ratio k of the reflector under the device setting conditions before the thrust is applied, and by means of the reflection and transmittance ratio, obtaining a reflected light power by multiplying the ratio by a reading of the first laser power meter when using the reflected light to generate a light pressure effect on the target; the reflection and transmittance ratio k is calculated by the method including: using a laser to obliquely enter a beam splitter at a certain incident angle, respectively mea-suring a power of reflected light and transmitted light passing through the beam splitter by using a high-precision power meter, and calculating and obtaining the reflectance and transmittance ratio k of the beam splitter corresponding to the incident angle;

Step 302, setting a laser and a shutter, preliminarily calculating a laser power level emitted by the laser accord-ing to the required applied micro-thrust, setting a light output power of the laser according to the calculated power, and then setting the opening time and the closing time of the shutter according to the magnitude of the required micro-impulse; the magnitude of the micro-thrust is $$F(t) = \sqrt{F_y^2(t) + F_x^2(t)},$$

wherein $F_y(t)=F(t)\cos \alpha$ is the magnitude of a resolved component of a vector of the micro-thrust in a plane formed by the incident laser light and the reflected light in a direction perpendicular to the reflector surface and pointing towards the reflector, satisfying:

$$F_y(t) = \frac{(k \cdot P_1(t) + P_2(t)) \cdot \cos\theta}{c};$$

and $F_x(t)=F(t)\sin \alpha$ is the magnitude of a resolved component of a vector of the micro-thrust in the plane formed by the laser incident light and the reflected light in a direction parallel to the reflector surface, satisfying:

$$F_x(t) = \frac{(k \cdot P_1(t) - P_2(t)) \cdot \sin\theta}{c},$$

k is the reflectance and transmittance ratio of the beam splitter; c is the speed of light in vacuum; $\theta$ is the incident angle of the laser beam at the reflector; a is the included angle between the direction of the micro-thrust and the normal of the reflector surface; $P_1(t)$ is the power of the laser beam transmitted through the beam splitter; and $P_2(t)$ is the power of the laser beam reflected by the reflector. Thus, in combination with the reflectivity of the reflector, the required light output power and the included angle of the laser can be derived.

In one embodiment of the present invention, the reflector installed on the target has a high reflectivity of more than 99.9%, so that the absorption of the laser beam by the reflector surface is small, the reflected optical power $P_2(t)$ being approximately equal to the incident light power $kP_1(t)$. At this time, the thrust $$F_x(t) = \frac{(k \cdot P_1(t) - P_2(t)) \cdot \sin\theta}{c}$$

of the light pressure in the direction parallel to the reflector surface is small and negligible. It is approximately considered that the thrust applied on the reflector surface is perpendicular to the reflector surface and points towards the target, and the magnitude thereof can be calculated according to $F(t)=F_y(t)$, wherein $F_y(t)$ refers to the magnitude of the component in the direction perpendicular to the reflector surface and pointing towards the reflector surface, and then the light output power of the laser is calculated according to the following formula:

$$F(t) = \frac{(k \cdot P_1(t) + P_2(t)) \cdot \cos\theta}{c},$$

k is the reflectance and transmittance ratio of the beam splitter; c is the speed of light in vacuum; $\theta$ is the incident angle of the laser beam at the reflector; $P_1(t)$ is the power of the laser beam transmitted through the beam splitter; and $P_2(t)$ is the power of the laser beam reflected by the reflector; since the reflectivity of the reflector is relatively high, it can be considered that $P_2(t)=kP_1(t)$, and then the light output power P(t) of the laser is preliminarily calculated as:

$$P(t) = (1 + k)\frac{cF(t)}{2k\cos\theta},$$

the opening time $t_0$ and the closing time $t_1$ of the shutter satisfy the following formula:

$$I = \int_{t_0}^{t_1} F(t)dt,$$

wherein I is the magnitude of the required micro-impulse, and the application position and direction of the micro-impulse are consistent with the application position and direction of the micro-thrust;

Step 303, turning on the laser, after turning on the laser, emitting the laser beam in parallel after the same passing through the beam adjustment device, and obliquely incidenting the laser beam on a beam splitter at a certain angle of incidence; dividing the laser into two beams by the beam splitter, wherein one beam reflected by the beam splitter is incident on a shutter, one beam transmitted through the beam splitter irradiates an optical power detection area of a first laser power meter, and a laser beam power k $P_1(t)$ for applying a micro-thrust can be obtained according to the real-time power $P_1(t)$ measured by the first laser power meter and the reflectance and transmittance ratio k of the beam splitter;

Step 304, opening the shutter: opening the shutter according to the opening time $t_0$ set in the step 302, so that the laser beam for applying the micro-thrust is incident on the reflector fixed on the target and is partially reflected, and in the process of being incident and reflected, the laser photon generates the micro-thrust action on the target, so as to realize the application of light pressure on the target; measuring, by the second laser power meter, the power $P_2(t)$ of the laser beam reflected via the reflector, and calculating in real time the magnitude of the micro-thrust applied to the target:

$$F(t) = \sqrt{F_y^2(t) + F_x^2(t)}, \text{ where,}$$
$$F_y(t) = \frac{(k \cdot P_1(t) + P_2(t)) \cdot \cos\theta}{c}; \text{ and } F_x(t) = \frac{(k \cdot P_1(t) - P_2(t)) \cdot \sin\theta}{c},$$

judging whether the requirements are met, and if not, adjusting the light output power of the laser in real time; and Step 305, turning off the device, after the closing time $t_1$ calculated from the shutter closing time set in the step 302 is reached, closing the shutter to block the laser beam, so that the micro-thrust application process ends, and then the laser is turned off.

In the process of applying the micro-thrust, a laser irradiates a reflector arranged on the target according to the light pressure action principle. In one embodiment of the present invention, the direction of the thrust applied to the target is perpendicular to the surface of the reflector and points towards the target. In the process of applying the micro-thrust, the magnitude of the applied micro-thrust and micro-impulse is calculated by real-time power measurement. On one hand, the optical power of the laser can be adjusted in real time according to needs. On the other hand, the data of the applied thrust and micro-impulse is recorded, and the response of the target under the action of the micro-thrust and micro-impulse is recorded, which can be used for the calibration of the micro-thrust and micro-impulse measuring device.

In the present invention, the micro-thrust and micro-impulse application device and method based on a light pressure principle generates a micro-thrust to a target by the light pressure action from laser reflection. The device comprises a laser, a laser adjustment device, a beam splitter, a shutter, a reflector, and a laser power meter. A laser beam is generated by the laser, a laser characteristic is adjusted by the laser adjustment device, and then the laser beam is divided into two paths via the beam splitter. In one path, it arrives at a position of the laser power meter, and a measured power is used for determining the magnitude of laser power used for applying a micro-thrust. In the other path, it irradiates on the reflector installed on a target via the shutter, thereby generating a micro-thrust on the target. The light reflected by the reflector arrives at the other laser power meter. The powers of the two paths of lasers are measured in real time by using the two laser power meters, the micro-thrust acting on the target can be calculated by combining parameters such as a reflectivity and an incident angle of the laser irradiating the reflector, and then the light output power of the laser can be adjusted in real time according to the calculated micro-thrust to meet the requirements. It can be used to calibrate a high-precision micro-thrust and micro-impulse measuring device by recording the micro-thrust and micro-impulse data applied to the target and recording the response of the target under its action.

We claim:

1. A micro-thrust and micro-impulse application device based on light pressure principle, comprising:
   a laser configured to generate a laser beam along a light path, wherein an output power of the laser is adjustable;
   a beam splitter arranged on the light path of the laser beam, wherein the beam splitter comprises a first included angle with the laser beam and divides the laser beam into a transmission laser beam along a transmission light path and a reflection laser beam along a reflection light path according to a reflectance and transmission ratio, and the reflectance and transmission ratio is changeable;
   a shutter arranged on the reflection light path of the reflection laser beam, wherein the shutter is configured to control on/off of the reflection laser beam passing through the shutter and being directed to a target;
   a reflector fixed on a surface of the target, wherein the reflector comprises a second included angle with the reflection laser beam that passes through the shutter, and the reflection laser beam is reflected by the reflector to form a reflected reflection laser beam along a reflected light path;
   a first laser power meter arranged on the transmission light path and configured to measure laser power of the transmission laser beam in real time, wherein the output power of the laser is monitored and obtained in real time based on the measured laser power of the transmission laser beam and the reflection and transmission ratio; and a second laser power meter arranged on the reflected light path of the reflected reflection laser beam and configured to measure laser power of the reflected reflection laser beam, wherein the second laser power meter is adapted to reduce re-irradiation of the reflected reflection laser beam on the target after being measured and reflected by the second laser meter,
   wherein a micro-thrust is generated on the target by light pressure from the reflection laser beam being irradiated on and reflected by the reflector and monitored in real time by the first and second laser power meters, a magnitude of the micro-thrust is adjustable in a range of $10^{-21}$ N to 10 mN, and a corresponding micro-impulse on the target is controlled by on-off time of the shutter, and a magnitude of the micro-impulse is adjustable in a range of $10^{-28}$ Ns to 100 Ns.

2. The device of claim 1, wherein the target is placed in a vacuum environment.

3. The device of claim 1, wherein the target is placed in a gas environment, and the gas environment effects little gas disturbance.

4. The device of claim 1, wherein the reflection laser beam is specularly reflected by the reflector.

5. A method for applying a micro-thrust and a micro-impulse by the device according to claim 1, comprising:
   using the laser beam to enter the beam splitter at the first included angle, respectively measuring power of the reflection laser beam and the transmission laser beam passing through the beam splitter, and calculating the reflectance and transmittance ratio of the beam splitter;
   preliminarily calculating the light output power of the laser and setting the laser according to magnitude of a required micro-thrust applied to the target, and setting an opening time and a closing time of the shutter according to a magnitude of the required micro-impulse;
   turning on the laser, calculating a laser beam power reflected by the beam splitter for applying the micro-thrust to the target by means of multiplying the reflectance and transmittance ratio of the beam splitter by the laser beam power measured from the first laser power meter;
   opening the shutter according to the set shutter opening time so that the laser beam is incident on the reflector and reflected;
   calculating the magnitude of the micro-thrust applied to the target in real time by measuring the power of the laser beam reflected by the reflector by the second laser power meter and according to the power measured by the first laser power meter and the second laser power meter, and judging whether the requirements are met, and if not, adjusting the light output power of the laser in real time; and
   after the set shutter closing time is reached, closing the shutter and turning off the laser.

6. The method of claim 5, wherein the magnitude of the micro-thrust applied to the target is $$F(t) = \sqrt{F_y^2(t) + F_x^2(t)},$$

wherein $F_y(t) = F(t)\cos \alpha$ is the magnitude of a resolved component of a vector of the micro-thrust in a plane formed by the incident laser light and the reflected light in a direction perpendicular to a reflector surface and pointing towards the reflector:

$$F_y(t) = \frac{(k \cdot P_1(t) + P_2(t)) \cdot \cos\theta}{c};$$

and $F_x(t) = F(t)\sin\alpha$ is the magnitude of a resolved component of a vector of the micro-thrust in the plane formed by the laser incident light and the reflected light in a direction parallel to the reflector surface:

$$F_x(t) = \frac{(k \cdot P_1(t) - P_2(t)) \cdot \sin\theta}{c},$$

wherein k is the reflectance and transmittance ratio of the beam splitter; c is the speed of light in vacuum; $\theta$ is the incident angle of the reflection laser beam at the reflector; $\alpha$ is the included angle between the direction of the micro-thrust and the normal of the reflector surface; $P_1(t)$ is the power of the laser beam transmitted through the beam splitter; and $P_2(t)$ is the power of the laser beam reflected by the reflector.

7. The method of claim 5, wherein the opening time to and the closing time $t_1$ of the shutter satisfy:

$$I = \int_{t_0}^{t_1} F(t)dt,$$

wherein I is the magnitude of the micro-impulse required, and the application position and direction of the micro-impulse are consistent with the application position and direction of the micro-thrust.

8. The method of claim 5, further comprising calculating the micro-thrust and the micro-impulse applied to the target according to the power measured by the first laser power meter and the second laser power meter, and the opening and closing time of the shutter, and applying the micro-thrust and the micro-impulse to a micro-thrust and micro-impulse measuring device and measuring its response so as to calibrate the micro-thrust and micro-impulse measuring device.

\* \* \* \* \*